United States Patent
Hatano et al.

(10) Patent No.: US 11,984,930 B2
(45) Date of Patent: May 14, 2024

(54) COMMUNICATION APPARATUS AND COMMUNICATION METHOD

(71) Applicant: NIPPON TELEGRAPH AND TELEPHONE CORPORATION, Tokyo (JP)

(72) Inventors: Tomoya Hatano, Musashino (JP); Manabu Yoshino, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 163 days.

(21) Appl. No.: 17/631,417

(22) PCT Filed: Aug. 2, 2019

(86) PCT No.: PCT/JP2019/030512
§ 371 (c)(1),
(2) Date: Jan. 28, 2022

(87) PCT Pub. No.: WO2021/024307
PCT Pub. Date: Feb. 11, 2021

(65) Prior Publication Data
US 2022/0278750 A1    Sep. 1, 2022

(51) Int. Cl.
*H04B 10/27*     (2013.01)
*H04L 41/40*     (2022.01)
*H04Q 11/00*     (2006.01)

(52) U.S. Cl.
CPC ............. *H04B 10/27* (2013.01); *H04L 41/40* (2022.05); *H04Q 11/0067* (2013.01)

(58) Field of Classification Search
CPC ...... H04B 10/27; H04L 41/40; H04Q 11/0067
USPC ...................................................... 398/58, 66
See application file for complete search history.

(56) References Cited

U.S. PATENT DOCUMENTS

| | | | |
|---|---|---|---|
| 8,631,151 B2 * | 1/2014 | You .................... | H04L 41/0896 398/58 |
| 2009/0060531 A1 * | 3/2009 | Biegert ............... | H04J 14/0232 398/214 |
| 2022/0182466 A1 * | 6/2022 | Hatano ............... | H04L 12/2861 |

* cited by examiner

*Primary Examiner* — Li Liu
(74) *Attorney, Agent, or Firm* — Harness, Dickey & Pierce, P.L.C.

(57) ABSTRACT

A communication device in a communication system in which functions that are converted to software are configured as a plurality of components, and the functions are realized as a result of the components being respectively executed by a plurality of communication devices that are connected to a network, the communication device including a platform for each component that realizes a function corresponding to a plurality of the networks, wherein the platform includes a common processing unit configured to execute processing that is not dependent on the network and a dependent processing unit for each network, the dependent processing unit being configured to execute processing that is dependent on the network.

8 Claims, 6 Drawing Sheets

COMMUNICATION APPARATUS AND COMMUNICATION METHOD

CROSS-REFERENCE TO RELATED APPLICATIONS

This application is a 371 U.S. National Phase of International Application No. PCT/JP2019/030512 filed on Aug. 2, 2019. The entire disclosure of the above application is incorporated herein by reference.

TECHNICAL FIELD

The present invention relates to a communication device and a communication method.

BACKGROUND ART

Examples of communication systems that include communication devices include a PON (Passive Optical Network) system. The PON system includes an optical subscriber line terminal device (ONU: Optical Network Unit) that is installed in a house of a customer, for example, an optical subscriber line terminal station device (OLT: Optical Line Terminal) that is a communication device installed in a station building, and an optical distribution network (ODN). In some cases, the ODN connects a plurality of ONUs and a plurality of OLTs.

If a function of a communication device that is not largely dependent on at least any of standards to which the device conforms, the generation, scheme, system, device type, and manufacturing vendor of the device is configured as a component, and at least a portion of an input/output interface (IF) such as an application programming interface (API) of the function is clarified to increase versatility, portability, and extendibility, it is possible to easily share the function between devices that differ from each other in at least any of standards to which the devices conform, generation, scheme, system, device type, and manufacturing vendor, and it is possible to easily add a unique function (see NPL 1, for example).

CITATION LIST

Non Patent Literature

[NPL 1] "Welcome to FASA Home Page", [online], NTT Access Network Service Systems Laboratories, [searched on Jul. 10, 2019], Internet <URL: http://www.ansl.ntt-.co.jp/j/FASA/index.html>

SUMMARY OF THE INVENTION

Technical Problem

When configuring functions of an OLT, which is a communication device, as components, the following cases are conceivable: a case where a PON interface unit and a computing unit are physically implemented by a single device, and a case where the PON interface unit and the computing unit are implemented by two or more devices (or platforms) in a distributed manner. In the case where these units are implemented by a single device, a WBS (White Box Switch) is used, for example.

On the other hand, in the case where these units are implemented by two or more devices (or platforms) in a distributed manner, a configuration may be adopted in which the functions are separated between a device that functions as the PON interface unit and a device (e.g., a server) that functions as the computing unit, for example. In this case, a configuration is conceivable in which the device that functions as the PON interface unit takes on a function of communicating with ONUs in accordance with a PON protocol and a function of transferring main signals, and the device (e.g., server) that functions as the computing unit takes on a function of performing processing on control signals and a function of managing overall processing of OLT functions, for example. Note that the control signals referred to here are signals such as "GATE" and "GRANT" in DBA (Dynamic Bandwidth Allocation), signals relating to OMCI (ONU Management and Control Interface) and OAM (Operation Administration and Maintenance: operation, administration, and maintenance of a network), and the like, for example.

If the PON interface unit and the computing unit that constitute the OLT are provided in a plurality of devices (or platforms) in a distributed manner as described above, control signals need to be transmitted and received between these functional units. Also, the plurality of devices including the functional units are sometimes installed at places that are apart from each other. For example, there is a case where functions such as a DBA function for which high-speed processing is required are implemented by a device that is installed in the vicinity of an SFP (Small Form-factor Pluggable)-type OLT, and functions such as an OAM function for which restrictions regarding time are relatively low are installed at a place (remote place) that is apart from the PON interface and are integrated into a single device corresponding to a plurality of PON interface units, for the sake of efficiency.

However, in a case where there are a plurality of PONs, even if a function for which restrictions regarding time are relative low is implemented by a central device, each of the plurality of PONs conventionally needs to include a functional unit having the function. Therefore, there is a problem in that an effect of reducing resources (computation resources) of the devices is not so large.

The present invention was made in view of the above circumstances, and has an object of providing a technology that can reduce computation resources.

Means for Solving the Problem

An aspect of the present invention is a communication device in a communication system in which functions that are converted to software are configured as a plurality of components, and the functions are realized as a result of the components being respectively executed by a plurality of communication devices that are connected to a network, the communication device including a platform for each component that realizes a function corresponding to a plurality of the networks, wherein the platform includes: a common processing unit configured to execute processing that is not dependent on the network; and a dependent processing unit for each network, the dependent processing unit being configured to execute processing that is dependent on the network.

Another aspect of the present invention is a communication method in which functions that are converted to software are configured as a plurality of components, and the functions are realized as a result of the components being respectively executed by a plurality of communication devices that are connected to a network, the communication method including a platform creating step of creating a platform for a component from a function that corresponds to a plurality of the networks, wherein the platform creating step includes: a common processing step of executing processing that is not dependent on the network; and a dependent processing step of executing processing that is dependent on the network, for each of the networks.

Effects of the Invention

According to the present invention, computation resources can be reduced.

DESCRIPTION OF EMBODIMENTS

Embodiment

The following describes an embodiment of the present invention with reference to the drawings. In the embodiment described below, a communication system is assumed in which functions of an OLT (optical subscriber line terminal station device) are configured as a plurality of components, and the components are provided in a distributed manner in devices that function as PON interface units and devices that function as computing units.

Figure 1:
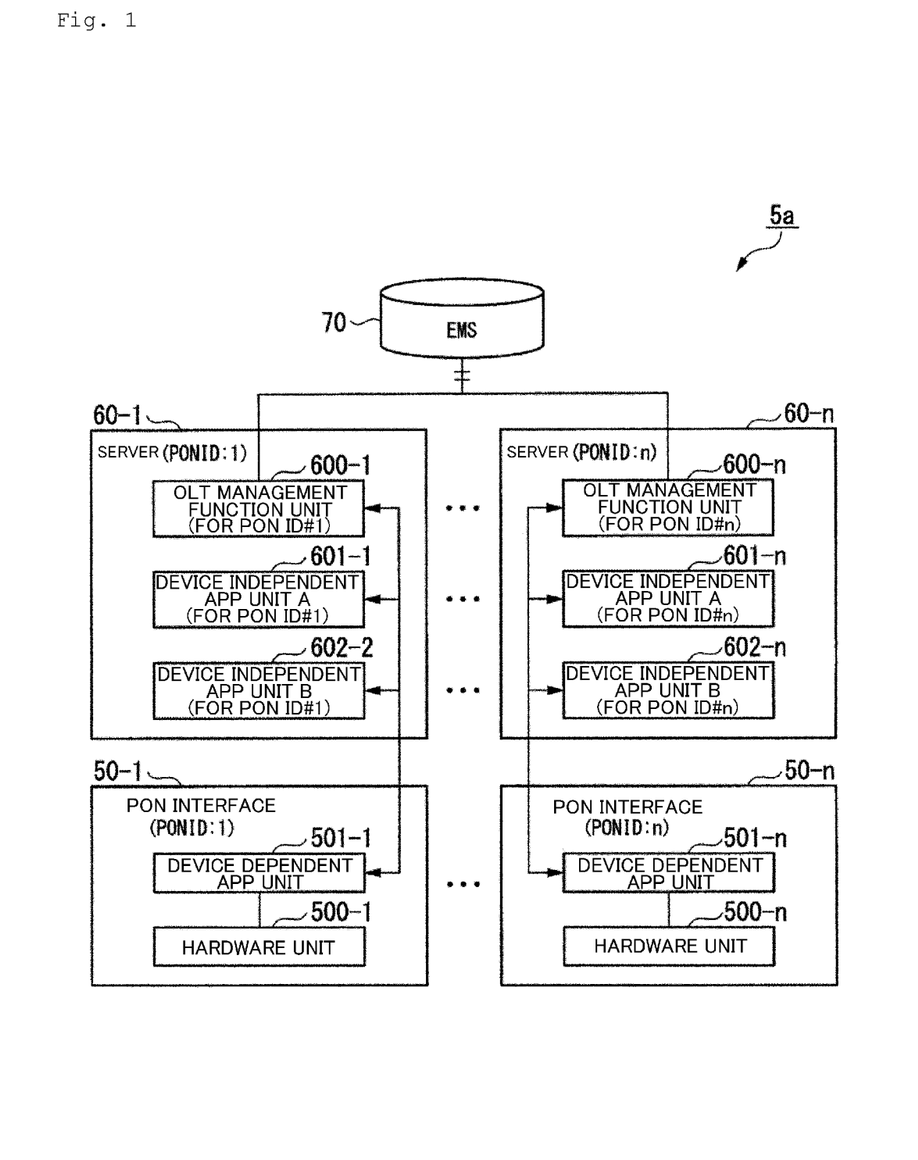
FIG. 1 is a block diagram showing a configuration of a communication system according to a conventional technology.

Note that the devices that function as the PON interface units are PON interfaces 10-1 to 10-n and PON interfaces 50-1 to 50-n, which will be described later, for example. Also, the devices that function as the computing units are an integration device 20, servers 60-1 to 60-n, and an integration device 60b, which will be described later, for example To facilitate understanding of descriptions of the configuration of a communication system 1 according to the present embodiment, first, configurations of communication systems according to conventional technologies will be described. FIG. 1 is a block diagram showing the configuration of a communication system according to a conventional technology.

A communication system 5a shown in FIG. 1 is a system that communicates with another communication device (e.g., ONU) using signals (e.g., optical signals) transmitted via an optical fiber network such as an ODN in a PON. The communication system 5a functions as n OLTs that correspond to n PONs, respectively.

As shown in FIG. 1, the communication system 1 includes PON interfaces 50-1 to 50-n, servers 60-1 to 60-n, and an EMS 70.

The PON interfaces 50-1 to 50-n and the servers 60-1 to 60-n include components that are hardware, software, or a combination of hardware and software, or functions that are configured as components. For example, the PON interfaces 50-1 to 50-n and the servers 60-1 to 60-n include software components such as applications that realize functions or the like that differ between services or telecommunications carriers, using a general-purpose input/output interface, and fundamental constitutional elements of an access network device that provide the general-purpose input/output interface to the software components and provide functions that need not be changed according to a service or a request because the functions are standardized, for example. An example of the general-purpose input/output interface is a FASA (registered trademark, Flexible Access System Architecture: new access system architecture) application API (see NPL 1). An example of the applications is a FASA (registered trademark) application (see NPL 1). An example of the fundamental constitutional elements of the access network device is a FASA (registered trademark) basis (see NPL 1). Owing to the use of the general-purpose input/output interface, functions can be easily added or replaced, and services can be flexibly and immediately provided for various requests.

Note that in the following description, an "application" may be referred to as an "app unit".

In some cases, the servers 60-1 to 60-n are collectively installed at a central place that is apart from the PON interfaces 50-1 to 50-n for the sake of efficiency.

As shown in FIG. 1, the PON interfaces 50-1 to 50-n respectively include hardware units 500-1 to 500-n that are hardware that executes processing relating to PONs, and device dependent app units 501-1 to 501-n that are software for executing the processing relating to the PONs.

PON IDs (PON Identifiers) that are identification information for identifying the PON interfaces are given to the PON interfaces 50-1 to 50-n. As shown in FIG. 1, the PON IDs given to the PON interfaces 50-1 to 50-n are 1 to n, respectively.

The device dependent app units 501-1 to 501-n respectively include device dependent app units (not shown) that are functional units having configurations that are dependent on the hardware units 500-1 to 500-n. That is, the device dependent app units (not shown) are functional units that are dependent on standards to which the hardware units 500 conform or manufacturing vendors of the devices. In other words, the device dependent app units (not shown) are functional units that are constituted by applications of which compatibility with other hardware is low and that cannot be used as is in newly manufactured hardware (in particular, hardware that conforms to different standards or is manufactured by a different manufacturing vendor).

Note that a configuration is also possible in which the device dependent app units 501-1 to 501-n respectively further include device independent app units (not shown) that are functional units having configurations that are not dependent on the hardware units 500-1 to 500-n.

As shown in FIG. 1, the servers 60-1 to 60-n respectively include OLT management function units 600-1 to 600-n, device independent app units A 601-1 to 601-n, and device independent app units B 602-1 to 602-n.

The above-described PON IDs are given to the servers 60-1 to 60-n. As shown in FIG. 1, the PON IDs given to the servers 60-1 to 60-n are 1 to n, respectively.

The device independent app units A 601-1 to 601-n are functional units having configurations that are not dependent on the hardware units 500-1 to 500-n, respectively. Also, the device independent app units B 602-1 to 602-*n* are functional units having configurations that are not dependent on the hardware units 500-1 to 500-*n*, respectively.

That is, the device independent app units A 601-1 to 601-*n* and the device independent app units B 602-1 to 602-*n* are functional units that are respectively not dependent on standards to which the hardware units 500-1 to 500-*n* conform or manufacturing vendors of the devices. In other words, the device independent app units A 601-1 to 601-*n* and the device independent app units B 602-1 to 602-*n* are functional units that are constituted by applications of which compatibility with other hardware is high and that can be used as is in newly manufactured hardware (in particular, hardware that conforms to different standards or is manufactured by a different manufacturing vendor).

Note that specific examples of applications included in the device independent app units A 601-1 to 601-*n* and the device independent app units B 602-1 to 602-*n* include an application for performing setting processing in a network device, an application for performing processing for changing settings, an application for monitoring, managing, or authenticating a network, and an application for performing algorithm processing.

Each of the OLT management function units 600-1 to 600-*n* unitarily accepts input of control signals that are output from the EMS 70. Based on the control signals output from the EMS 70, the OLT management function units 600-1 to 600-*n* output various instructions and information for checking states or the like to the functional units of the communication system 5*a*. Also, the OLT management function units 600-1 to 600-*n* respectively perform setting for the device independent app units A 601-1 to 601-*n*, the device independent app units B 602-1 to 602-*n*, the device dependent app units 501-1 to 501-*n*, and the hardware units 500-1 to 500-*n*, change or delete settings, and monitor states of these units.

Note that the EMS (Element Management System) 70 is a system that manages devices (i.e., the PON interfaces 50-1 to 50-*n* and the servers 60-1 to 60-*n*) that constitute networks.

The device dependent app units (not shown) respectively included in the device dependent app units 501-1 to 501-*n*, the device independent app units A 601-1 to 601-*n*, and the device independent app units B 602-1 to 602-*n* are functional units corresponding to functions of OLTs that are configured as components (converted to software). As described above, the device dependent app units (not shown) are applications having configurations that are dependent on the hardware units 500-1 to 500-*n* respectively included in the PON interfaces 50-1 to 50-*n*. Accordingly, the device dependent app units (not shown) need to be respectively included in the device dependent app units 501-1 to 501-*n* respectively included in the PON interfaces 50-1 to 50-*n*.

The device independent app units A 601-1 to 601-*n* and the device independent app units B 602-1 to 602-*n* include basic functions such as the DBA function and the OAM function of the OLTs, for example. Also, the device independent app units A 601-1 to 601-*n* and the device independent app units B 602-1 to 602-*n* include an optional function and an edge computing function of the OLTs, for example.

Note that a configuration is also possible in which the device independent app units A 601-1 to 601-*n* and the device independent app units B 602-1 to 602-*n* are respectively included in the PON interfaces 50-1 to 50-*n*.

The communication system 5*a* functions as an OLT in a PON that has the PON ID 1 with use of the PON interface 50-1 having the PON ID 1 and the server 60-1 having the same PON ID 1, for example. Similarly, the communication system 5*a* functions as an OLT in a PON that has the PON ID n with use of the PON interface 50-*n* having the PON ID n and the server 60-*n* having the same PON ID n, for example.

As described above, in some cases, the servers 60-1 to 60-*n* are collectively installed at a central place (remote plate) that is apart from the PON interfaces 50-1 to 50-*n* for the sake of efficiency. However, as shown in FIG. 1, the conventional communication system 5*a* needs to include the individual servers 60-1 to 60-1 that respectively include the OLT management function units 600-1 to 600-*n* and the like for the plurality of (n) PONs. Therefore, the communication system 5*a* does not have an effect of reducing resources (computation resources) of the devices.

Figure 2:
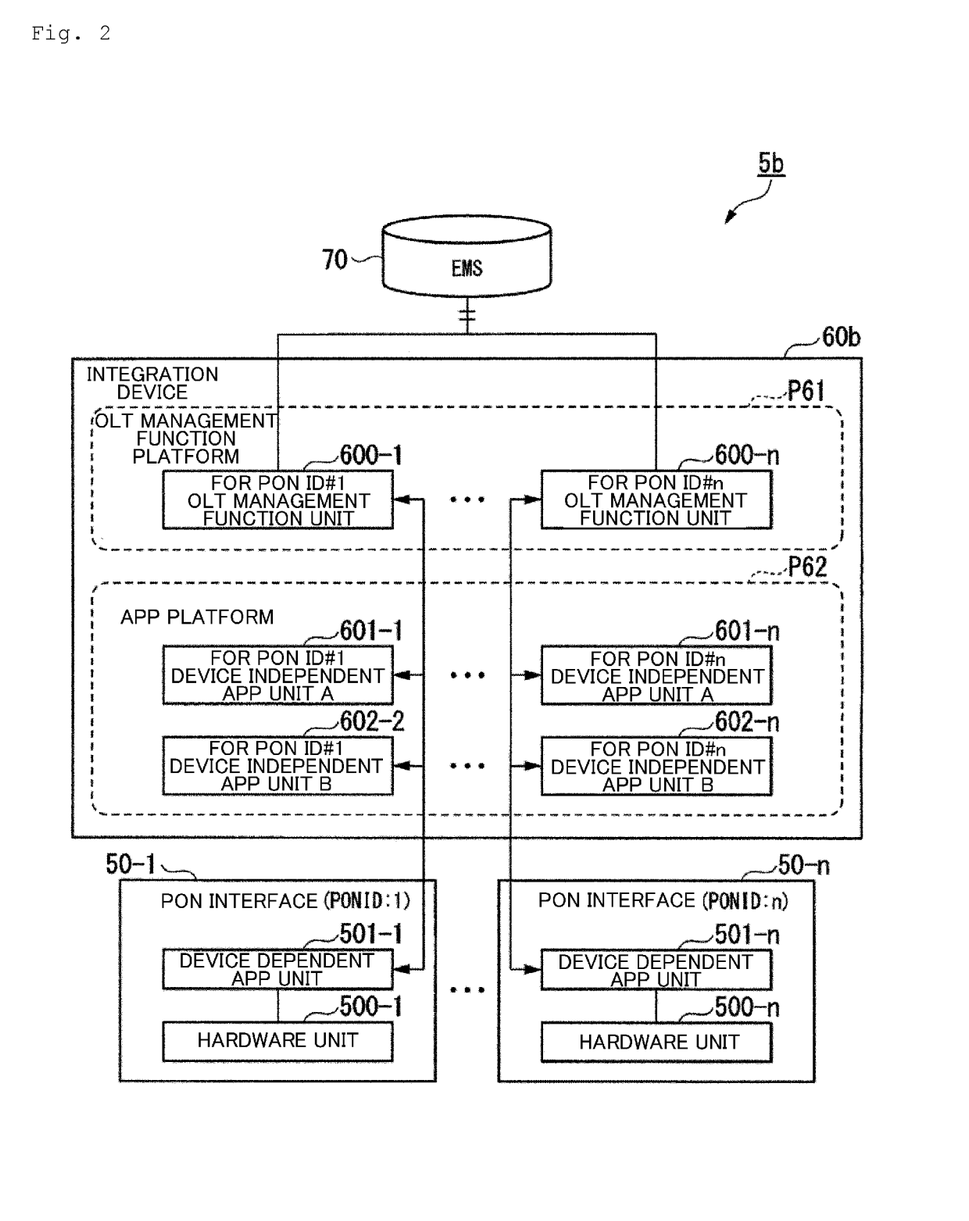
FIG. 2 is a block diagram showing another configuration of a communication system according to a conventional technology.

FIG. 2 is a block diagram showing another configuration of a communication system according to a conventional technology. As shown in FIG. 2, a communication system 5*b* includes PON interfaces 50-1 to 50-*n* and an integration device 60*b*. The configuration of the communication system 5*b* differs from that of the communication system 5*a* described above in that the OLT management function units 600-1 to 600-*n*, the device independent app units A 601-1 to 601-*n*, and the device independent app units B 602-1 to 602-*n* are integrated into a single device (the integration device 60*b*).

As shown in FIG. 2, the integration device 60*b* includes an OLT management function platform P61 and an app platform P62. The platforms referred to here are common bases for effectively managing the plurality of (n) PONs. The OLT management function platform P61 is a platform for the OLT management function units 600-1 to 600-*n*. Also, the app platform P2 is a platform for the device independent app units A 601-1 to 601-*n* and the device independent app units B 602-1 to 602-*n*.

As described above, in the communication system 5*b*, the OLT management function units 600-1 to 600-*n* are integrated into the OLT management function platform P61 of the integration device 60*b*. Also, in the communication system 5*b*, the device independent app units A 601-1 to 601-*n* and the device independent app units B 602-1 to 602-*n* are integrated into the app platform P62. Therefore, the communication system 5*b* can reduce resources (computation resources) of the device, when compared to the communication system 5*a* shown in FIG. 1.

However, as shown in FIG. 2, in the conventional communication system 5*b*, the OLT management function units 600-1 to 600-*n* for the plurality of (n) PONs need to be provided in the OLT management function platform P61. Also, as shown in FIG. 2, in the conventional communication system 5*b*, the device independent app units A 601-1 to 601-*n* and the device independent app units B 602-1 to 602-*n* need to be provided for the plurality of PONs in the app platform P62.

Therefore, the effect of reducing resources (computation resources) of the device is limited even in the communication system 5*b*. Also, in the communication system 5*b*, control signals of the plurality of PONs need to be transmitted separately from each other, and therefore, it is necessary to provide the same number of physically separated ports as the PONs. In contrast, the communication system 1 according to the present embodiment described below can solve the above problems.

Configuration of Communication System

The following describes a functional configuration of the communication system 1.

Figure 3:
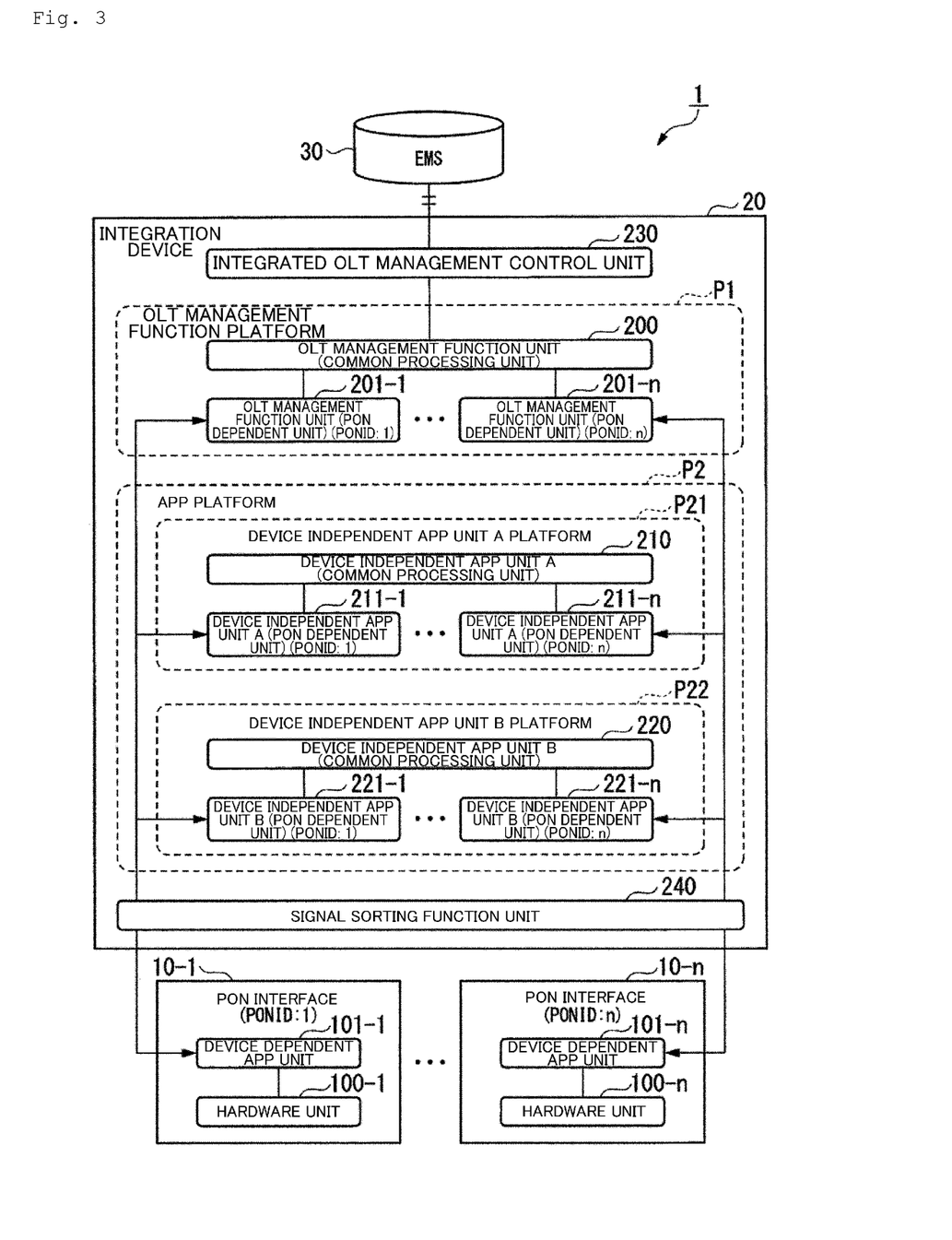
FIG. 3 is a block diagram showing a functional configuration of a communication system according to an embodiment of the present invention.

FIG. 3 is a block diagram showing the functional configuration of the communication system 1 according to an embodiment of the present invention. As shown in FIG. 3, the communication system 1 includes PON interfaces 10-1 to 10-*n*, an integration device 20, and an EMS 30.

The PON interfaces 10-1 to 10-*n* and the integration device 20 include components that are hardware, software, or a combination of hardware and software, or functions that are configured as components.

In some cases, the integration device 20 is collectively installed at a central place (remote place) that is apart from the PON interfaces 10-1 to 10-*n* for the sake of efficiency.

As shown in FIG. 3, the PON interfaces 10-1 to 10-*n* respectively include hardware units 100-1 to 100-*n* that are hardware that executes processing relating to PONs, and device dependent app units 101-1 to 101-*n* that are software for executing the processing relating to the PONs.

PON IDs (PON Identifiers) that are identification information for identifying the PON interfaces are given to the PON interfaces 10-1 to 10-*n*. As shown in FIG. 3, the PON IDs given to the PON interfaces 10-1 to 10-*n* are 1 to n, respectively.

The device dependent app units 101-1 to 101-*n* respectively include device dependent app units (not shown) that are functional units having configurations that are dependent on the hardware units 100-1 to 100-*n*. That is, the device dependent app units (not shown) are functional units that are dependent on standards to which the hardware units 100-1 to 100-*n* conform or manufacturing vendors of the devices. In other words, the device dependent app units (not shown) are functional units that are constituted by applications of which compatibility with other hardware is low and that cannot be used as is in newly manufactured hardware (in particular, hardware that conforms to different standards or is manufactured by a different manufacturing vendor).

Note that a configuration is also possible in which the device dependent app units 101-1 to 101-*n* respectively further include device independent app units (not shown) that are functional units having configurations that are not dependent on the hardware units 100-1 to 100-*n*.

The integration device 20 is a communication device that is included in the communication system 1 in which functions that are converted to software are configured as a plurality of components (functional units), and the functions are realized as a result of the components (functional units) being respectively executed by a plurality of communication devices (e.g., the PON interfaces 10-1 to 10-*n* and the integration device 20) that are connected to a network.

More specifically, the communication system 1 realizes functions as OLTs in a plurality of PONs at the same time, and the integration device 20 is a central device that collectively includes, out of the functional units (components) constituting the above-described functions, functional units (components) that can be integrated into a place (remote place) that is apart from the PON interfaces 10-1 to 10-*n*.

As shown in FIG. 3, the integration device 20 includes an OLT management function unit (common processing unit) 200, OLT management function units (PON dependent units) 201-1 to 201-*n*, a device independent app unit A (common processing unit) 210, device independent app units A (PON dependent units) 211-1 to 211-*n*, a device independent app unit B (common processing unit) 220, device independent app units B (PON dependent units) 221-1 to 221-*n*, an integrated OLT management control unit 230, and a signal sorting function unit 240.

Also, as shown in FIG. 3, the integration device 20 includes an OLT management function platform P1 and an app platform P2. The platforms referred to here are common bases for effectively managing the plurality of (n) PONs. The OLT management function platform P1 is a platform for the OLT management function unit (common processing unit) 200 and the OLT management function units (PON dependent units) 201-1 to 201-*n*.

The app platform P2 is a group of platforms that are provided for respective app units. In the present embodiment, a case is assumed as an example in which the integration device 20 includes two app units, which are a device independent app unit A and a device independent app unit B. Note that the integration device 20 may include a suitable number of app units.

The app platform P2 includes a device independent app unit A platform P21 and a device independent app unit B platform P22. The device independent app unit A platform P21 is a platform for the device independent app unit A (common processing unit) 210 and the device independent app units A (PON dependent units) 211-1 to 211-*n*. Also, the device independent app unit B platform P22 is a platform for the device independent app unit B (common processing unit) 220 and the device independent app units B (PON dependent units) 221-1 to 221-*n*.

As shown in FIG. 3, in the present embodiment, the OLT management function units are separated into the common processing unit and the plurality of (n) PON dependent units (dependent processing units). The common processing unit is a functional unit that is formed by integrating functional units that are conventionally redundantly provided in OLT management function units provided for respective PONs and that execute common processing that is not dependent on the PONs. With this configuration, resources (computation resources) of the device are reduced. The PON dependent units are functional units that are provided for the respective PONs and execute processing that is dependent on the PONs (processing that differs between the PONs). The PON dependent units manage management parameters and the like of the respective PONs.

Similarly, the device independent app units A are separated into the common processing unit and the plurality of (n) PON dependent units. The common processing unit is a functional unit formed by integrating functional units that are conventionally redundantly provided in device independent app units A provided for the respective PONs and that execute common processing that is not dependent on the PONs. With this configuration, resources (computation resources) of the device are reduced. The PON dependent units are functional units that are provided for the respective PONs and execute processing that is dependent on the PONs (processing that differs between the PONs). The PON dependent units manage management parameters and the like of the respective PONs.

Similarly, the device independent app units B are separated into the common processing unit and the plurality of (n) PON dependent units. The common processing unit is a functional unit formed by integrating functional units that are conventionally redundantly provided in device independent app units B provided for the respective PONs and that execute common processing that is not dependent on the PONs. With this configuration, resources (computation resources) of the device are reduced. The PON dependent units are functional units that are provided for the respective PONs and execute processing that is dependent on the PONs (processing that differs between the PONs). The PON dependent units manage management parameters and the like of the respective PONs.

Note that a configuration is also possible in which a common parameter database (not shown) is provided in the app platform P2, and management parameters are managed using the database, for example.

The integrated OLT management control unit 230 unitarily accepts input of control signals of the PONs output from the EMS 30. With respect to each control signal, the integrated OLT management control unit 230 determines a PON that corresponds to the control signal. The integrated OLT management control unit 230 adds a label (e.g., PON ID) to the control signal based on the determination result. The integrated OLT management control unit 230 outputs the control signal to the OLT management function platform P1. Also, the integrated OLT management control unit 230 unitarily accepts control signals that are output from the OLT management function platform P1 and outputs the control signals to the EMS 30.

Based on control signals that are output from the integrated OLT management control unit 230, the OLT management function unit (common processing unit) 200 and the OLT management function units (PON dependent units) 201-1 to 201-n output various instructions and information for checking states or the like to the functional units of the communication system 1. Also, the OLT management function unit (common processing unit) 200 and the OLT management function units (PON dependent units) 201-1 to 201-n perform setting regarding the device independent app unit A (common processing unit) 210, the device independent app units A (PON dependent units) 211-1 to 211-n, the device independent app units B (PON dependent units) 221-1 to 221-n, the device dependent app units 101-1 to 101-n, and the hardware units 100-1 to 100-n, change or delete settings, and monitor states of these units.

Note that it is also possible to configure the integrated OLT management control unit 230 and the OLT management function unit (common processing unit) 200 as a single functional unit by integrating functions of these units.

The signal sorting function unit 240 (sorting unit) unitarily accepts input of control signals that are output from the PON interfaces 10-1 to 10-n. Note that PON IDs that are associated with the PON interfaces 10-1 to 10-n are added to the control signals by the PON interfaces 10-1 to 10-n. Based on the PON IDs added to the control signals, the signal sorting function unit 240 sorts the control signals into functional units associated with the PON IDs.

Note that the device independent app unit A (common processing unit) 210, the device independent app units A (PON dependent units) 211-1 to 211-n, the device independent app unit B (common processing unit) 220, and the device independent app units B (PON dependent units) 221-1 to 221-n include basic functions such as the DBA function and the OAM function of the OLTs, for example.

Also, the device independent app unit A (common processing unit) 210, the device independent app units A (PON dependent units) 211-1 to 211-n, the device independent app unit B (common processing unit) 220, and the device independent app units B (PON dependent units) 221-1 to 221-n include an optional function and an edge computing function of the OLTs, for example.

Note that a configuration is also possible in which the device independent app unit A (common processing unit) 210, the device independent app units A (PON dependent units) 211-1 to 211-n, the device independent app unit B (common processing unit) 220, and the device independent app units B (PON dependent units) 221-1 to 221-n are also included in the PON interfaces 10-1 to 10-1.

Operations of Communication System

Figure 4:
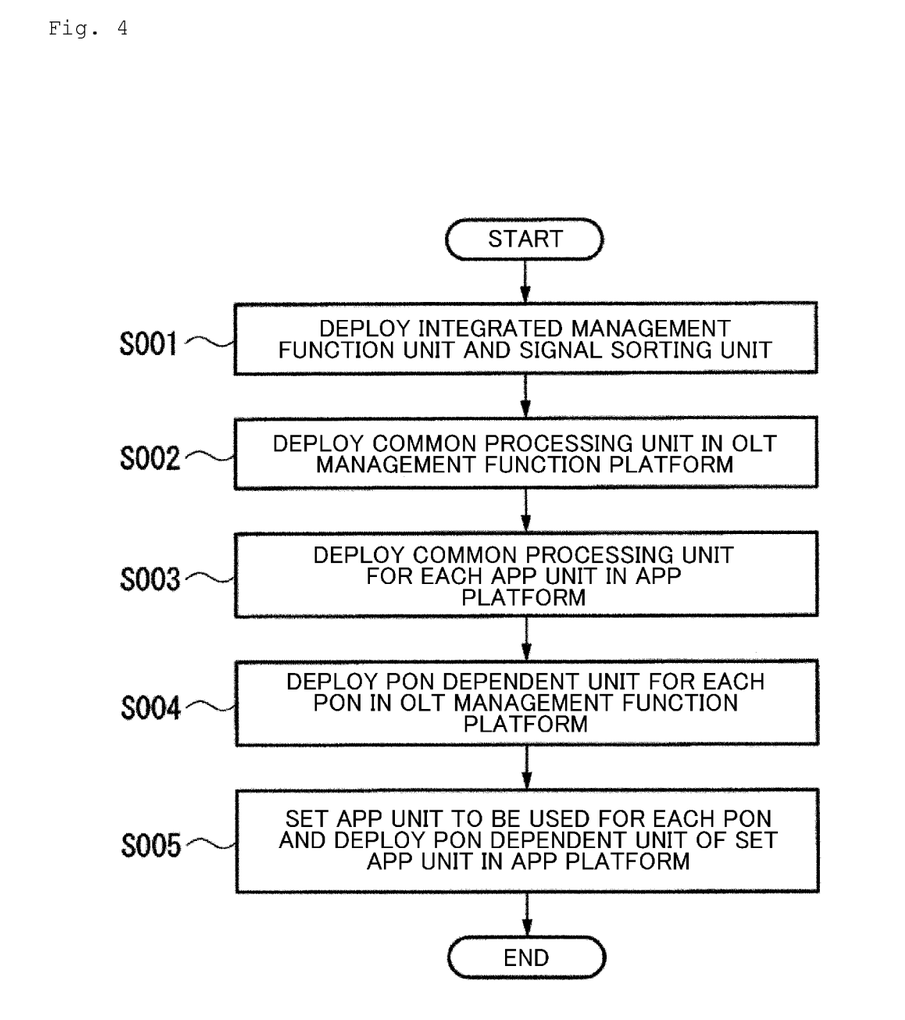
FIG. 4 is a flowchart showing operations of an integration device according to an embodiment of the present invention.
Figure 5:
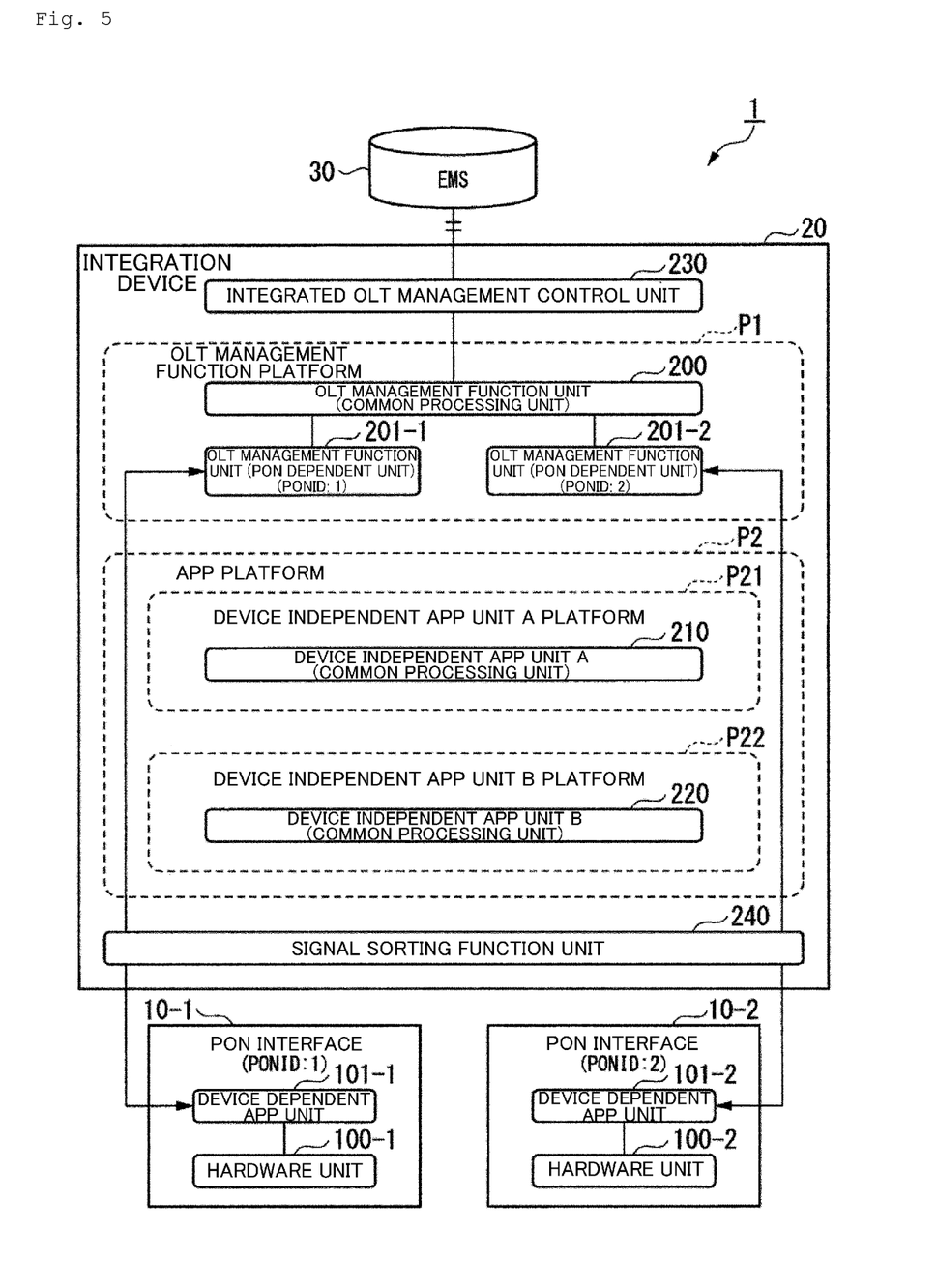
FIG. 5 is a diagram showing an initial state of function integration processing performed by the communication system according to an embodiment of the present invention.

The following describes an example of operations of the communication system 1 in function integration processing. Here, it is assumed that the number of PONs is two, for example. FIG. 4 is a flowchart showing an example of the operations of the communication system according to an embodiment of the present invention. FIG. 5 is a diagram showing an initial state of the function integration processing performed by the communication system according to an embodiment of the present invention.

As shown in FIG. 5, first, the communication system 1 deploys, as common functional units that are needed, the integrated OLT management control unit 230 and the signal sorting function unit 240 in the integration device 20 (FIG. 4, step S001).

Also, the communication system 1 deploys the OLT management function unit (common processing unit) 200 in the OLT management function platform P1 of the integration device 20 (FIG. 4, step S002).

Also, the communication system 1 deploys common processing units for respective app units in the app platform. That is, the communication system 1 deploys the device independent app unit A (common processing unit) 210 in the device independent app unit A platform P21 of the app platform P2 of the integration device 20. Also, the communication system 1 deploys the device independent app unit B (common processing unit) 220 in the device independent app unit B platform P22 of the app platform P2 of the integration device 20 (FIG. 4, step S003).

Also, the communication system 1 deploys the same number of OLT management function units (PON dependent units) as the PONs, in the OLT management function platform P1 of the integration device 20 (FIG. 4, step S004).

Next, the communication system 1 determines which application is to be implemented for each PON, and performs setting. Then, with respect to each PON, the communication system 1 deploys a PON dependent unit of the app unit that is set as described above, in the app platform (FIG. 4, step 3005).

Figure 6:
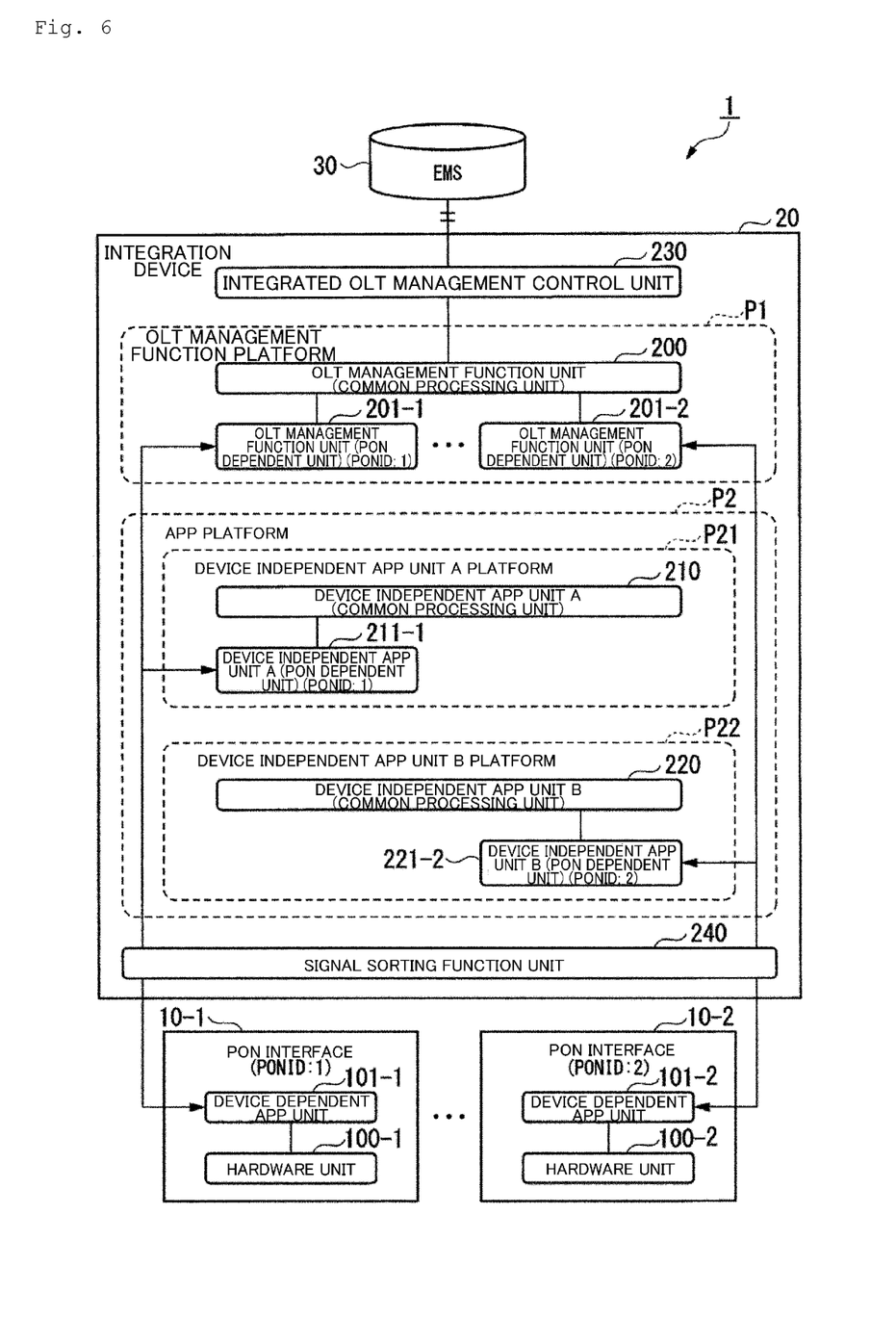
FIG. 6 is a diagram showing the function integration processing performed by the communication system according to an embodiment of the present invention.

FIG. 6 is a diagram showing the function integration processing performed by the communication system according to an embodiment of the present invention. FIG. 6 shows a case as an example in which a device independent app unit A 211-1 is implemented for a PON that has a PON ID 1, and a device independent app unit B 221-2 is implemented for a PON that has a PON ID 2.

Note that setting for enabling each app unit can be performed with respect to each PON. Also, each app unit can be suitably executed irrespective of the number of other app units, the number of PONs, and whether or not the app unit is enabled in other PONs, for example. Thus, the integration device 20 according to the present embodiment can secure independence of the PONs and efficiently implement necessary functions without implementing unnecessary app units.

As described above, the communication system 1 according to an embodiment of the present invention includes the integration device 20 that is a central device disposed at a place (remote place) that is apart from the PON interfaces. The integration device 20 includes functional units that function as OLTs and are configured as platforms. For example, as shown in FIG. 3, the integration device 20 includes the OLT management function platform P1 and platforms for respective app units (i.e., the device independent app unit A platform P21 and the device independent app unit B platform P22).

By creating platforms as described above, the communication system 1 can manage functional units in each platform by separating the functional units into a common processing unit and PON dependent units. The PON dependent units are individual functional units for which settings are individually managed for the respective PONs. Also, in addition to the above configuration, the communication system 1 includes the signal sorting function unit 240 that can appropriately sort control signals for the respective PONs and respective functional units. Also, the communication system 1 includes the integrated OLT management control unit 230 that can appropriately sort control signals from the EMS 30 into the functional units.

With the above configuration, the communication system 1 according to the embodiment of the present invention makes it possible to efficiently implement functional units that function as the plurality of OLTs in the communication device, and reduce resources (computation resources) of the device.

Note that in the above embodiment, a case is described as an example in which the communication system 1 is a communication system that realizes functions of OLTs in a PON system. However, devices (or systems) to which the present invention is applied are not limited to such a system, and the above-described communication system 1 can also be applied to an access device or a transfer device, for example.

At least a portion of the communication system 1 of the above-described embodiment may be realized by a computer. In such a case, a program for realizing the functions may be recorded on a computer-readable recording medium, and the functions may be realized by loading the program recorded on this recording medium to a computer system, and executing the program. Note that the "computer system" used herein includes an OS and hardware such as peripheral devices. Also, the "computer-readable recording medium" refers to a portable medium such as a flexible disk, a magneto-optical disk, a ROM, or a CD-ROM, or a storage device built in the computer system, such as a hard disk. Furthermore, examples of the "computer-readable recording medium" include a medium that dynamically holds the program for a short period of time, like a communication line when transmitting the program through a network such as the Internet or a communication line such as a telephone line, and a medium that holds the program for a certain period of time like a volatile memory in a computer system that serves as a server or a client in that case. Also, the above-described program may be a program for realizing some of the aforementioned functions, a program that can realize the aforementioned functions in combination with a program that has already been recorded in the computer system, or a program that is realized using a programmable logic device such as a FPGA (Field Programmable Gate Array).

REFERENCE SIGNS LIST

1 Communication system
5a, 5b Communication system
10-1 to 10-n PON interface
20 Integration device
50-1 to 50-n PON interface
60-1 to 60-n Server
60b Integration device
100-1 to 100-n Hardware unit
101-1 to 101-n Device dependent app unit
200 OLT management function unit (common processing unit)
201-1 to 201-n OLT management function unit (PON dependent unit)
230 Integrated OLT management control unit
240 Signal sorting function unit
500 Hardware unit
500-1 to 500-n Hardware unit
501-1 to 501-n Device dependent app unit
600-1 to 600-n OLT management function unit

The invention claimed is:

1. A communication device in a communication system in which functions that are converted to software are configured as a plurality of components, and the functions are realized as a result of the components being respectively executed by a plurality of communication devices that are connected to a network, the communication device comprising
a platform for each component that realizes a function corresponding to a plurality of the networks, wherein the platform includes:
a common processing unit configured to execute processing that is not dependent on the network;
a dependent processing unit for each network, the dependent processing unit being configured to execute processing that is dependent on the network; and
a sorting unit configured to acquire information from the network and sort the information into the dependent processing unit corresponding to the network that is indicated by the information.

2. The communication device according to claim 1, further comprising
a management control unit configured to acquire information from a system that manages devices constituting the network and output the information to the dependent processing unit corresponding to the network that is indicated by the information.

3. The communication device according to claim 1, wherein
the processing that is dependent on the network is processing that is dependent on at least one of standards to which a device constituting the network conforms and a manufacturing vendor of the device constituting the network.

4. The communication device according to claim 1, wherein
the dependent processing unit is an application having a configuration that is not dependent on hardware of a device constituting the network.

5. The communication device according to claim 1, wherein
the dependent processing unit executes processing relating to at least one of dynamic bandwidth allocation of an optical subscriber line terminal station device and operation, administration, and maintenance of the optical subscriber line terminal station device.

6. The communication device according to claim 1, wherein
the platform includes an OLT management function platform that manages an optical subscriber line terminal station device and an application platform that is constituted by platforms for respective applications having configurations that are not dependent on hardware of a device constituting the network.

7. A communication method in which functions that are converted to software are configured as a plurality of components, and the functions are realized as a result of the components being respectively executed by a plurality of communication devices that are connected to a network, the communication method comprising
  a platform creating step of creating a platform for each component from a function that corresponds to a plurality of the networks, wherein
  the platform creating step includes:
  a common processing step of executing processing that is not dependent on the network; and
  a dependent processing step of executing processing that is dependent on the network, for each of the networks; and
  a sorting unit configured to acquire information from the network and sort the information into the dependent processing unit corresponding to the network that is indicated by the information.

8. A communication device in a communication system in which functions that are converted to software are configured as a plurality of components, and the functions are realized as a result of the components being respectively executed by a plurality of communication devices that are connected to a network, the communication device comprising
  a platform for each component that realizes a function corresponding to a plurality of the networks, wherein
  the platform includes:
  a common processing unit configured to execute processing that is not dependent on the network; and
  a dependent processing unit for each network, the dependent processing unit being configured to execute processing that is dependent on the network, wherein the dependent processing unit is an application having a configuration that is not dependent on hardware of a device constituting the network.

* * * * *